United States Patent
Piper et al.

(10) Patent No.: US 9,145,850 B2
(45) Date of Patent: *Sep. 29, 2015

(54) POWER SYSTEM COMPRISING A CONDENSATION INJECTION SYSTEM

(71) Applicant: Deere & Company, Moline, IL (US)

(72) Inventors: Erik L. Piper, Cedar Falls, IA (US); Richard E. Winsor, Waterloo, IA (US)

(73) Assignee: DEERE & COMPANY, Moline, IL (US)

(*) Notice: Subject to any disclaimer, the term of this patent is extended or adjusted under 35 U.S.C. 154(b) by 375 days.

This patent is subject to a terminal disclaimer.

(21) Appl. No.: 13/662,854

(22) Filed: Oct. 29, 2012

(65) Prior Publication Data

US 2014/0116404 A1   May 1, 2014

(51) Int. Cl.
*F02M 25/07* (2006.01)
*F02M 25/022* (2006.01)
*F02M 25/03* (2006.01)
*F02M 25/028* (2006.01)

(52) U.S. Cl.
CPC ....... *F02M 25/0222* (2013.01); *F02M 25/0227* (2013.01); *F02M 25/074* (2013.01); *F02M 25/0732* (2013.01); *F02M 25/028* (2013.01); *F02M 25/03* (2013.01); *F02M 25/073* (2013.01); *F02M 25/0707* (2013.01); *Y02T 10/121* (2013.01)

(58) Field of Classification Search
CPC ..... Y02T 10/121; Y02T 10/144; F02B 37/00; F02B 29/0406; F02B 29/0468; F02M 25/0732; F02M 25/0707; F02M 25/074; F02M 25/0709; F02M 25/071

USPC ........... 123/25 A, 25 C, 25 J, 568.11, 568.12; 60/320, 321, 599, 605.2, 612

See application file for complete search history.

(56) References Cited

U.S. PATENT DOCUMENTS

| | | | |
|---|---|---|---|
| 4,711,771 A * | 12/1987 | Schiller | 423/359 |
| 5,785,030 A | 7/1998 | Paas | |
| 6,301,887 B1 * | 10/2001 | Gorel et al. | 60/605.2 |
| 6,367,256 B1 * | 4/2002 | McKee | 60/605.2 |
| 6,470,682 B2 * | 10/2002 | Gray, Jr. | 60/605.2 |
| 6,725,847 B2 * | 4/2004 | Brunemann et al. | 123/568.12 |
| 6,748,741 B2 * | 6/2004 | Martin et al. | 60/605.2 |
| 7,146,263 B2 | 12/2006 | Guven et al. | |
| 8,230,843 B2 * | 7/2012 | Kurtz | 123/568.12 |
| 2003/0154716 A1 * | 8/2003 | Redon | 60/605.2 |
| 2007/0144501 A1 * | 6/2007 | Joergl et al. | 123/568.12 |
| 2009/0000283 A1 * | 1/2009 | Endicott et al. | 60/309 |
| 2009/0000297 A1 * | 1/2009 | Joergl et al. | 60/605.3 |
| 2009/0071150 A1 * | 3/2009 | Joergl et al. | 60/605.2 |
| 2010/0115960 A1 * | 5/2010 | Brautsch et al. | 60/772 |

(Continued)

FOREIGN PATENT DOCUMENTS

JP   2009030544 A * 2/2009

*Primary Examiner* — Thomas Moulis
*Assistant Examiner* — Joseph Dallo

(57) ABSTRACT

Disclosed is a power system comprising a condensation injection system positioned downstream of an EGR cooler. The condensation injection system comprises a condensation pump and a condensation injector. The condensation injector is positioned downstream of the condensation pump. The condensation pump is configured to pump the condensation to the condensation injector, and the condensation injector is configured to inject the condensation into the intake gas, the intake gas being a combination of a fresh intake gas and a recirculated portion of an exhaust gas.

19 Claims, 3 Drawing Sheets

(56) References Cited

U.S. PATENT DOCUMENTS

2010/0242929 A1* 9/2010 Kardos et al. ............ 123/568.12
2011/0100341 A1* 5/2011 Yacoub .................... 123/568.11
2011/0259306 A1* 10/2011 Winsor et al. ............ 123/568.12

* cited by examiner

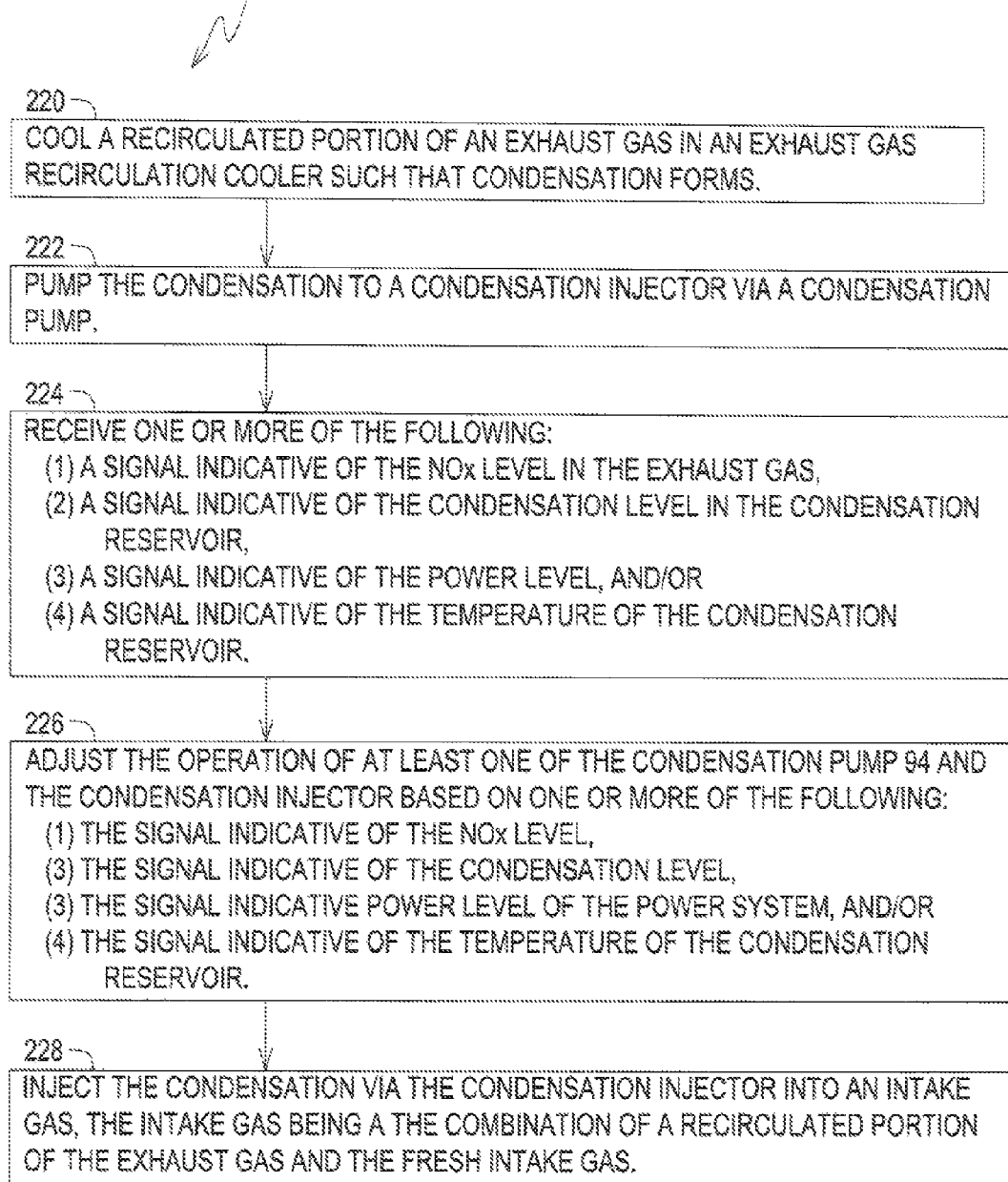

POWER SYSTEM COMPRISING A CONDENSATION INJECTION SYSTEM

FIELD OF THE DISCLOSURE

The present disclosure relates to a power system. More particularly, of the present disclosure relates to a power system comprising a condensation injection system.

BACKGROUND OF THE DISCLOSURE

All engines—diesel, gasoline, propane and natural gas—produce exhaust gas containing carbon monoxide, hydrocarbons, and nitrogen oxides ("NOx"). These emissions are the result of incomplete combustion. Additionally, diesel engines also produce particulate matter ("PM"). As more focus is placed on health and environmental issues, governmental agencies throughout the world are enacting more stringent emissions laws.

Because so many diesel engines are used in trucks, the U.S. Environmental Protection Agency and its counterparts in Europe and Japan first focused on setting emissions regulations for the on-road market. While the worldwide regulation of nonroad diesel engines came later, the pace of cleanup and rate of improvement has been more aggressive for nonroad engines relative to on-road engines.

Manufacturer of nonroad diesel engines are expected to meet specific emissions regulations. For example, Tier 3/Stage III A emissions regulations required an approximate 65 percent reduction in PM and a 60 percent reduction in NOx from 1996 levels. As a further example, Interim tier 4/Stage III B regulations required a 90 percent reduction in PM along with a 50 percent drop in NOx. Still further, Final Tier 4/Stage IV regulations which will be fully implemented by 2015, will take PM and NOx emissions to near-zero levels.

PM is a non-gaseous product of combustion commonly seen as smoke. It is made up of carbon, which is incompletely burned fuel and hydrocarbons, and is the visible, black smoke. PM also contains sulfuric acid which is created from the sulfur found in diesel fuel. PM and ash may both be trapped in, for example, a diesel particulate filter ("DPF").

To reduce the remaining NOx, a power system may comprise an exhaust gas recirculation ("EGR") system. The EGR system recirculates a portion of the engine's exhaust gas back into an intake manifold of the engine. The recirculated portion of the exhaust gas reduces the concentration of oxygen therein, thus lowering the combustion temperature, slowing the chemical reactions, and decreasing the formation of NOx. However, because the recirculated portion of the exhaust as may contain water vapor—the amount of water vapor being dependent on the humidity of the air and the fuel quantity burned—excessive cooling may result in condensation in the EGR system.

One problem associated with condensation, in the recirculated portion of the exhaust gas, is that it may not uniformly flow into the engine's cylinders. This may result in excess NOx in some cylinders and simultaneously excess PM in other cylinders. Another problem is that under some other operating conditions, there may be so much condensation that it may form pools and rivers. Such conditions may lead to poor ignition characteristics. What is needed, in the art, is a condensation injection system that addresses these issues.

SUMMARY OF THE DISCLOSURE

Disclosed is a power system comprising an internal combustion engine. The internal combustion engine comprises an intake manifold, an exhaust manifold, and a cylinder. The cylinder is positioned fluidly between the intake manifold and the exhaust manifold. The intake manifold is configured to intake an intake gas, and the exhaust manifold is configured to exhaust an exhaust gas.

The power system also comprises an EGR system. The EGR system is configured to receive a recirculated portion of the exhaust gas. The intake gas is a combination of a fresh intake gas and the recirculated portion of the exhaust gas. The EGR system is positioned downstream of the exhaust manifold. The EGR system comprises an EGR cooler, and it is configured to cool the recirculated portion of the exhaust gas. The recirculated portion of the exhaust gas is cooled such that, under at least some operating conditions, condensation forms.

Additionally, the power system comprises a condensation injection system, which comprises a condensation pump and a condensation injector. The condensation injector is positioned downstream of the condensation pump. The condensation pump is configured to pump the condensation to the condensation injector, and the condensation injector is configured to inject the condensation into the intake gas.

As stated above, providing condensation to a cylinder slows the NOx formation therein. And by using a condensation injection system, the condensation may be carefully injected to the cylinder. For example, the condensation injection system may control the timing and the quantity of the injections, so that NOx formation is minimized and, at the same time, positive ignition characteristics are maintained.

BRIEF DESCRIPTION OF THE DRAWINGS

The detailed description of the description refers to the accompanying figures in which:

FIG. 3 is a flow chart of a method for the first and second embodiments of the power system.

DETAILED DESCRIPTION OF THE DRAWINGS

Figure 1:
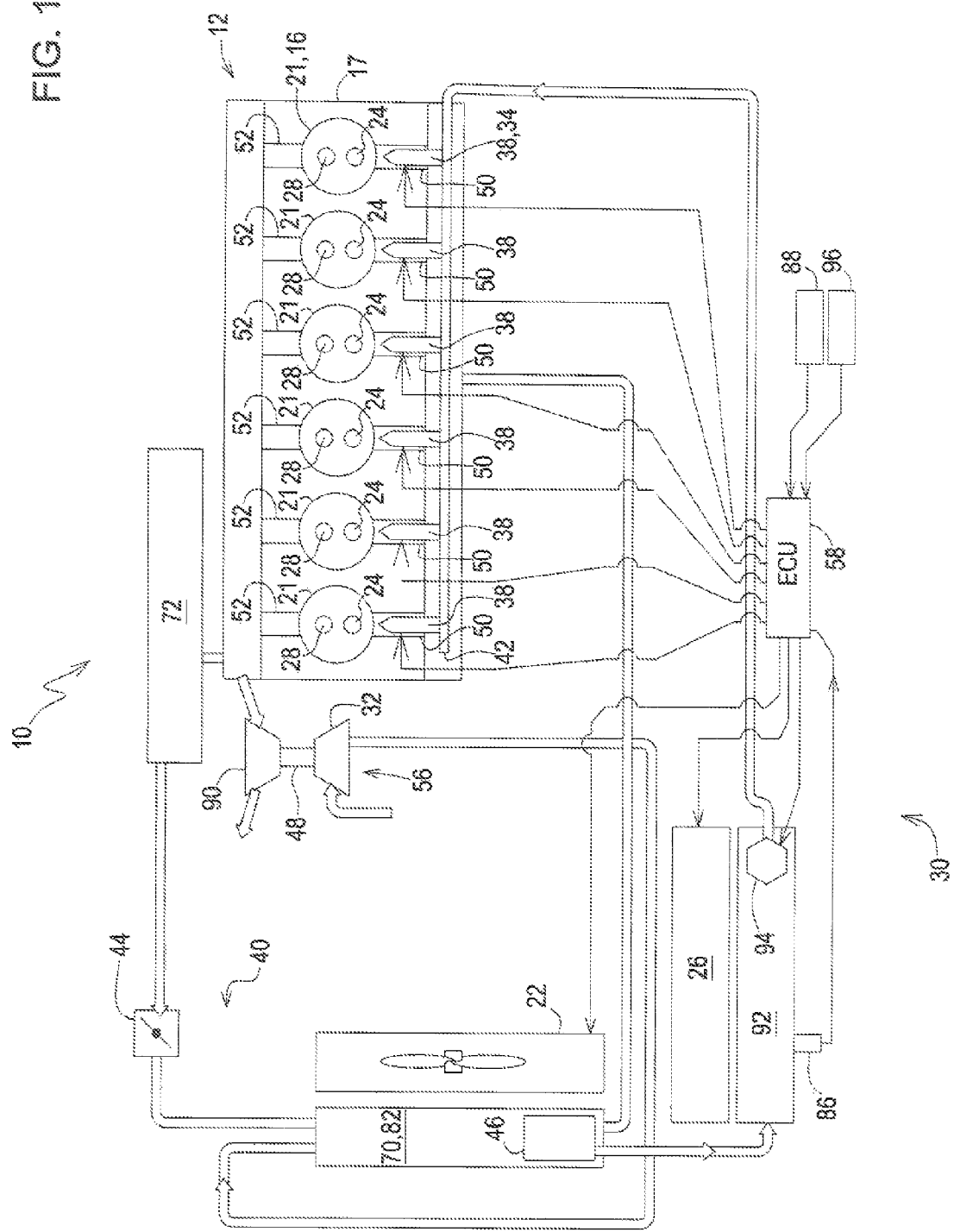
FIG. 1 is a diagrammatic view of a first embodiment of a power system comprising a condensation injector system.

Referring to FIG. 1, there is shown is a diagrammatic view of a first embodiment of a power system 10. The power system 10 comprises an internal combustion engine 12, and the engine 12 comprises an intake manifold 18, an exhaust manifold 20, and a cylinder 16. The cylinder 16 may be one of a plurality of cylinders 21. A plurality of intake valves 24 may be positioned upstream of the plurality of cylinders 21, and a plurality of exhaust valves 28 may be positioned downstream of the plurality of cylinders 21.

The cylinder 16 is positioned fluidly between the intake manifold 18 and the exhaust manifold 20. The intake manifold 18 is configured to intake an intake gas, and the exhaust manifold 20 is configured to exhaust an exhaust gas. The intake manifold 18 and the exhaust manifold 20 may be mounted to an engine head 17. The intake manifold 18 is shown as a cutaway so as to be able to see—among other things—the plurality of intake valves 24; the plurality of exhaust valves 28; and the plurality of cylinders 21, which may be formed into an engine block (not directly shown). Although the engine 12 is illustrated as an in-line, six cylinder engine, the engine 12 may be oriented in various kinds of ways and have an number of cylinders.

The power system 10 also comprises an EGR system 40 that is configured to receive a recirculated portion of the exhaust gas. The intake gas is a combination of a fresh intake gas and the recirculated portion of the exhaust gas. The EGR system 40 comprises an EGR cooler 78 and an EGR valve 44. In the illustrated arrangement, the EGR cooler 70 is positioned downstream of the EGR vale 44. The EGR valve 44 is configured to control how much of the exhaust gas becomes the recirculated portion of the exhaust gas, and the EGR cooler 70 is configured to cool the recirculated portion of the exhaust gas. Under at least some operating conditions, the recirculated portion of the exhaust gas is cooled, in the EGR cooler 70, to such an extent that condensation forms.

The power system 10, additionally, comprises a condensation injection system 30. The condensation injection system 30 comprises a condensation pump 94 and a condensation injector 34. The condensation injector 34 may be one of a plurality of condensation injectors 38. The condensation injector 34 is positioned downstream of the condensation pump 94. The condensation pump 94 is configured to pump the condensation to the condensation injector 34, and the condensation injector 34 is configured to inject the condensation into the exhaust gas.

The timing of the injection of the condensation may be, for example, just prior to the injection of fuel into the cylinder 16. In some embodiments, the condensation injector 34 may be disposed in the intake manifold 18, because the intake manifold 18 provides tight, secure, and warm environment for the condensation injector 34.

As shown in the illustrated embodiment, the EGR cooler 70 may be a low temperature ("LT") EGR cooler 82, and in such an embodiment, a high temperature ("HT") EGR cooler 72 may be positioned upstream of the LT EGR cooler 82. Further, in the illustrated embodiment, the EGR valve 44 is positioned fluidly between the LT EGR cooler 82 and the HT EGR cooler 72. In other embodiments, however, the EGR valve 44 may be positioned upstream of both of the LT EGR cooler 82 and the HT EGR cooler 72, or the EGR valve 44 may be positioned downstream of both.

The LT EGR cooler 82 may be air cooled. For example, in the illustrated embodiment, a fan 22 pull ambient air across the LT EGR cooler 82 and pushes the ambient air past the engine 12, so as to cool the LT EGR cooler 82 and the engine 12 simultaneously. In other embodiments, however, the fan 22 may be placed such that it, for example, pushes air across both the LT EGR cooler 82 and the engine 12, or such that it pulls air across the LT EGR cooler 82 and the engine 12.

Exemplarily, an electronic control unit ("ECU") 58 may control the fan 22 so as to prevent condensation from freezing in, exemplarily, a condensation reservoir 92. For example, if the condensation in the condensation reservoir 92, is close to freezing, then the ECU 58 may control the fan 22 so that it operates more slowly or not at all, thus allowing the temperature of the condensation to increase.

The LT EGR cooler 82 and HT EGR cooler 72 cooperate so as to lower the temperature of the recirculated portion of the exhaust gas, which lowers combustion temperatures in the plurality of cylinders 21 and, ultimately, lowers NOx output levels. In the embodiment shown, the fresh intake gas and the recirculated portion of the exhaust gas mix in the LT EGR cooler 82. Exemplarily, the LT EGR cooler 82 may be an 85 kW cooler.

The LT EGR cooler 82 may be in the form of a heat exchanger and be, for example, a tube and shell style EGR cooler. The size of the LT EGR cooler 82 may depend on the size of the engine 12 and may also depend on the emission standard that the engine must comply with.

As shown in FIG. 1, the engine 12 may comprise an intake port 15 positioned upstream of the cylinder 16 that is configured to allow the intake gas into the cylinder 16. The intake port 15 may be formed into the engine head 17, and it may be one of a plurality of intake ports 50. Additionally, a plurality of exhaust ports 52 may also be formed into the engine head 17. In some embodiments, the condensation injector 34 may be configured so as to inject the condensation into the intake gas in the intake port (i.e., a port injection approach). With such an approach, the plurality of condensation injectors 38 may be mounted in the intake manifold 18. In such an arrangement, the plurality of condensation injectors 38 may inject the condensation at a relatively low pressure, resulting in the intake gas vaporizing the condensation, just prior to the mixture entering the plurality of cylinders 21.

Alternatively, the plurality of condensation injectors 38 may be direct injectors (i.e., a plurality of condensation injectors 38 that inject condensation directly into the plurality of cylinders 21, downstream of the plurality of intake valves 24). In such an embodiment, the plurality of condensation injectors 38 may be sealed so that the plurality of cylinders 21 can maintain pressure during combustion, and also sealed so that the plurality of condensation injectors 38 are not damaged. Additionally, in such an embodiment, the plurality of condensation injectors 38 may be designed so as to withstand the high pressures and temperatures in the plurality of cylinders 21.

Furthermore, the power system 10 may comprise a compressor 32 positioned upstream of the intake manifold 18. In such an embodiment, the condensation may be injected into the intake gas downstream of the compressor 32. During an intake stroke, the compressor 32 rotates, compresses the fresh intake gas, and forces it into the LT EGR cooler 82. During an exhaust stroke, at least one of a plurality of exhaust valves 28 opens, which allows the exhaust gas to flow through the exhaust manifold 20 and the turbine 90. The pressure and volume of the exhaust gas drives the turbine 90, and the turbine 90 drives the compressor 32 via a shaft 48.

The combination of the compressor 32, the shaft 48, and the turbine 90 is known as a turbocharger 56. The power system 10 may also comprise, for example, a second turbocharger (not shown) that cooperates with the turbocharger 56. Exemplarily, the second turbocharger may be a variable geometry turbocharger or a wastegate turbocharger, and an intercooler (not shown) may be positioned between the turbocharger 56 and the second turbocharger.

The condensation injection system 30 and comprise a condensation reservoir 92. The condensation reservoir 92 may be configured to collect the condensation, and the condensation pump 94 may be configured to draw condensation from the condensation reservoir 92. The condensation reservoir 92 may be made of, for example, plastic or metal.

The power system 10 may comprise a separator 46 disposed in the LT EGR cooler 82. The separator 46 may be configured to separate the condensation from the recirculated portion of the exhaust gas, and the condensation reservoir 92 may be configured to receive condensation from the separator 46. In some embodiments, the separator 46 may be, for example, an inertial separator, such as a cyclone separator or a baffle separator. In an inertial separator, the recirculated portion of the exhaust gas may be required to go around sharp corners, thereby causing water vapor to impact the corners and separate, from the recirculated portion of the exhaust gas, and form condensation. In yet other embodiments, the separator 46 may be, for example, a coalescing filter.

The power system 10 may comprise a heat source 26 positioned adjacent to the condensation reservoir 92, the heat source 26 being configured to heat the condensation reservoir 92 so as to prevent the condensation from freezing. The heat source 26 may be, for example, an electric resistance heater, or the heat source 26 may be, as just one additional example, a portion of the engine coolant system, which may be circulating coolant that is relatively warm as compared to the condensation reservoir 92. The condensation pump 94 may be disposed in the condensation reservoir 92, so if the condensation reservoir 92 is warm, then the condensation pump 94 is warm and operable, too. Without the heat source 26, under some operating conditions of the power system 10, the condensation may freeze in the condensation reservoir 92, assuming that the condensation reservoir 92 is not sufficiently warm (i.e., less than the freezing temperature of the condensation). This may occur, for example, if the power system 10 is in a harsh, cold environment.

The power system 10 may additionally comprise an electronic control unit 58 ("ECU"). Exemplarily, the ECU 58 may have four primary functions: (1) converting analog sensor inputs to digital outputs, (2) performing mathematical computations for all fuel and other systems, (3) performing self diagnostics, and (4) storing information. The ECU 58 may also serve as a governor of the engine 12 by controlling the fuel injection timing and strategy, so that the fuel is delivered according to a given set of conditions for a given engine, such as engine 12. The ECU 58 may also look for out of parameter conditions and report these on a CAN bus for technicians to review.

Furthermore, the ECU 58 may control the plurality of condensation injectors 38 and, thus, their respective condensation flow rates. To illustrate each of the plurality of condensation injectors 38 may be independent of the others, and each of the plurality of condensation injectors 38 may be open only when commanded to be so by the ECU 58. For example, the ECU 58 may command the condensation injector 34 to open when its respective piston is moving through an intake stroke, or the ECU 58 may, as a more specific example, command the condensation injector 34 to open when its respective piston is in approximately the middle of its stroke, this being the position that the piston is moving the fastest in any given stroke. Accordingly, commanding the condensation injector 34 to open—in the middle of a stroke—may promote proper mixing of the condensation, the intake gas, and the injected fuel.

In some embodiments, the ECU 58 may be configured to receive a signal indicative of a temperature of the condensation reservoir 92, and the ECU 58 may be configured to adjust the operation of the heat source 26 based on the signal indicative of the temperature of the condensation reservoir 92. In such an embodiment, a temperature sensor 88 may be used for providing the temperature of the condensation reservoir 92 directly. Or, alternatively, the temperature sensor 88 may be used for providing a temperature of some other location on the power system 10. In such an embodiment, the ECU 58 may need to calculate, for example, what the temperature of the condensation reservoir 92 is.

In operation, if the condensation reservoir 92 is relatively cold, then the ECU 58 may adjust the heat source 26 so that the condensation reservoir 92 becomes relatively warm. In contrast, if the condensation reservoir 92 is relatively warm, then the ECU 58 may adjust the heat source 26, so that heat source 26 does not unnecessarily warm the condensation reservoir 92. With respect to both of these examples, the ECU 58 may alternately, or additionally, adjust the condensation pump 94.

Further, the ECU 58 may be, for example, configured to receive a signal indicative of a NOx level in the exhaust gas, and the ECU 58 may be configured to adjust the operation of at least one of the condensation pump 94 and the condensation injector 34 based on the signal indicative of the NOx level.

A NOx sensor 96 may provide the NOx level signal. In some embodiments, however, the ECU 58 may calculate, provide, and receive the NOx level signal. The adjustment may depend on the ECU 58 being configured to determine, for example, a desired pulse width of the condensation injector 34 by retrieving the desired pulse width from a table of values indexed by the signal indicative of the NOx level.

To illustrate, if the NOx level is relatively high, then the ECU 58 may, for example, adjust the condensation injector 34 to remain open for a relatively long amount of time for a given injection. Alternatively, if the NOx level is relatively low, then the ECU 58 may, for example, adjust the condensation injector 34 to remain open for a relatively short amount of time for a given injection, so as to retain the condensation in the condensation reservoir 92.

With respect to both of these examples, the ECU 58 may alternately, or additionally, adjust the condensation pump 94. In such an embodiment, the condensation pump 94 may have on-off capabilities and varying speed capabilities for controlling the rate of condensation flow.

Still further, in some embodiments, the ECU 58 may be configured to receive a signal indicative of a condensation level in the condensation reservoir 92, and the ECU 58 may be configured to adjust the operation of at least one of the condensation pump 94 and the condensation injector 34 based on the signal indicative of the condensation level. A condensation level sensor 86 may provide the signal indicative of the condensation level. The adjustment may depend on, for example, the ECU 58 being configured to determine a desired pulse width of the condensation injector 34 by retrieving the desired pulse width from a table of values indexed by the signal indicative of the condensation level.

To illustrate, if the condensation reservoir 92 is relatively full of condensation, then the ECU 58 may, for example, adjust the condensation injector 34 to remain open for a relatively long period of time for a given injection, so as to lower the condensation level. During such conditions, the power system 10 may utilize the condensation, even though it may not be necessary for lowering NOx levels in the exhaust gas. In contrast, if the condensation reservoir 92 is relatively empty, then the ECU 58 may, for example, adjust the condensation injector 34 to remain open for a relatively short period of time for a given injection, so as to save condensation, in the condensation reservoir 92, for when it may be needed for lowering the NOx levels in the exhaust gas.

Further yet, the ECU 58 may configured to receive a signal indicative of a power source speed, a signal indicative of a fuel setting, and a signal indicative of a fuel injection timing. With these signals, the output torque of the power system 10 may be determined, by the ECU 58, by using, as just one example, the following equation:

$$T_{PS} = a_0 + a_1 w_{PS} + a_2 t + a_3 r + a_4 W_{PS}^2 a_5 t^2 + a_6 r^2 + a_7 r w_{PS}^2 + a_8 r t^2 + a_9 t r^2 a_{10} t^3 + a_{11} r^3$$

Where:
$T_{PS}$ is the estimated output torque of the power system 10;
$a_i$ is a coefficient;
$W_{PS}$ is the sensed speed of the power system 10;
r is the sensed fuel setting; and
t is the sensed fuel injection timing.

Next, the ECU 58 may be configured to determine the power level of the engine 12 via the estimated output torque ($T_{PS}$) and the sensed speed ($W_{PS}$) of the power system 10. Further yet, the ECU 58 may be configured to adjust the operation of at least one of the condensation pump 94 and the condensation injector 34 based on the determined power of the power system 10. The adjustment may depend on the ECU 58 being configured to determine a desired pulse with of the condensation injector 34 by retrieving the desired pulse width from a table of values indexed by the signal indicative of the determined power of the power system 10.

To illustrate, if the determined power level is relatively high, then the ECU 58 may, for example, adjust the condensation injector 34 to remain open for a relatively long period of time for a given injection, so as to lower the NOx levels in the exhaust, which tend to be relatively high during times when the determined power is also relatively high. Conversely, if the determined power level is relatively low, then the ECU 58 may adjust the condensation injector 34 to remain open for a relatively short period of time for a given injection.

Figure 2:
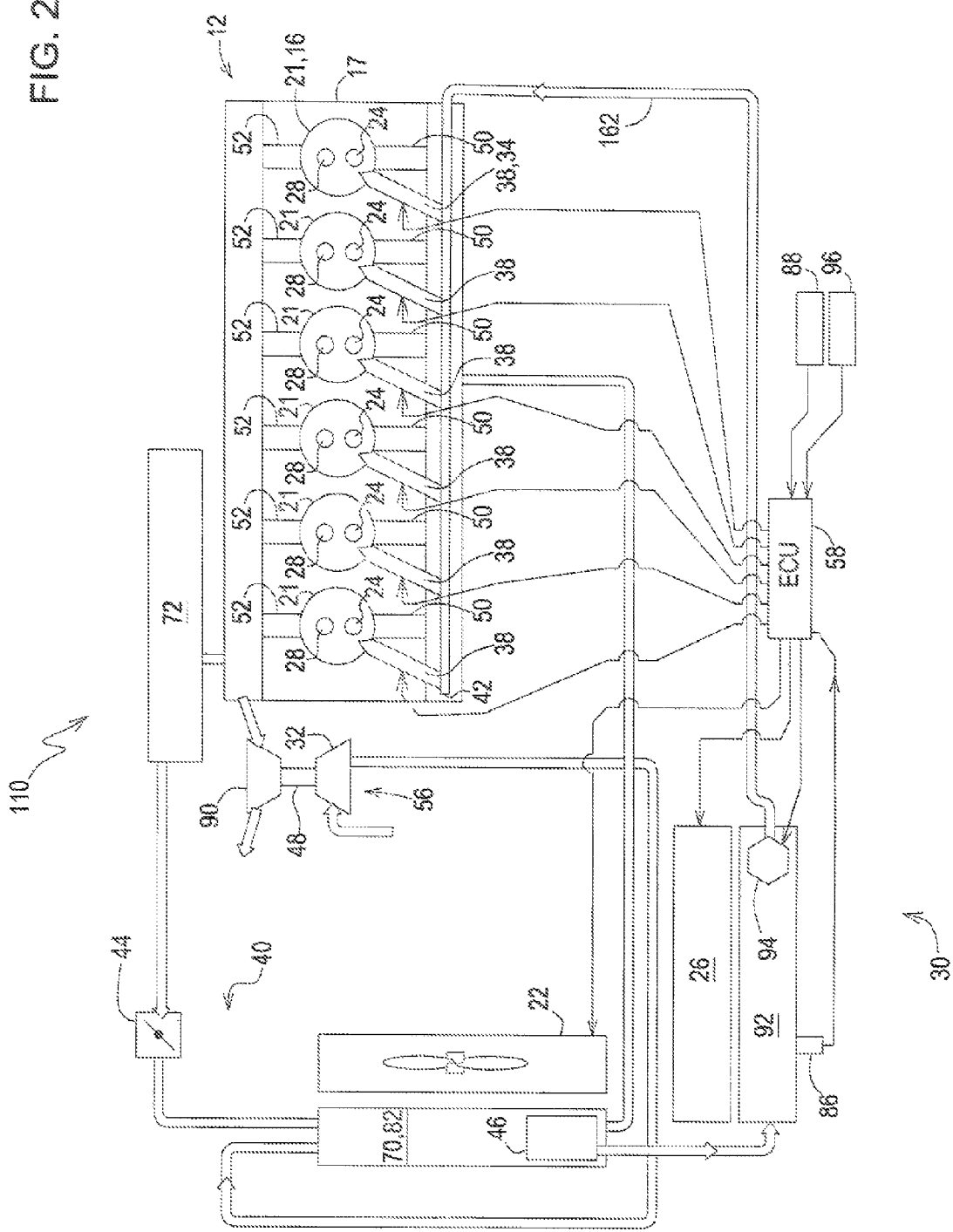
FIG. 2 is a diagrammatic view of a second embodiment of the power system comprising the condensation injector system.

Referring to FIG. 2, there shown a diagrammatic view of a second embodiment of the power system 110. A difference between the first and second embodiments of the power system 10, 110 is the positioning of the condensation injector 34. Still, the second embodiment of the power system 110 has many components similar in structure and function as the first embodiment of the power system 10, as indicated by the use of identical reference numbers where applicable.

In the second embodiment of the power system 110, the condensation injector 34 is configured so as to inject condensation into the intake gas downstream of the intake port 15 (i.e., a direct injection approach). In the direct injection approach, the plurality of condensation injectors 38 is at least partially positioned in the plurality of cylinders 21. Here, the plurality of condensation injectors 38 inject condensation directly into the plurality of cylinders 21, and the condensation and the intake gas mix in the plurality of cylinders 21. In such an embodiment, only the intake as flows through the intake manifold 18.

Referring to FIG. 3, there is shown a method 218 for the first and second embodiments of the power systems 10, 110. Act 220 of the method 218 is cooling the recirculated portion of the exhaust was in the EGR cooler 70 such that, under at least some operating conditions, condensation forms. Act 222 of the method 218 may comprise pumping the condensation to the condensation injector 34 via the condensation pump 94.

Act 224 of the method 218 comprises receiving one or more of the following: (1) a signal indicative of the NOx level in the exhaust gas, (2) a signal indicative of the condensation level in the condensation reservoir 92, (3) a signal indicative of the power level, (4) a signal indicative of the temperature of the condensation reservoir 92.

Act 226 of the method 218 comprises adjusting the operation of at least one of the condensation pump 94 and the condensation injector 34 based on one or more of the following: (1) the signal indicative of the NOx level, (2) the signal indicative of the condensation level, (3) the signal indicative power level, and (4) and the signal indicative of the temperature of the condensation reservoir 92.

Act 228 of the method 218 is injecting the condensation via the condensation injector 34 into the intake gas, the intake as being the combination of the recirculated portion of the exhaust gas and the fresh intake gas. In some embodiments of the method 218, introducing condensation into the intake gas may occur downstream of the compressor 32. For example, some embodiments of the method 218 may comprise the step of introducing the condensation into the intake gas in the intake port 15. In contrast, other embodiments of the method 218 may comprise the step of introducing the condensation into the intake gas downstream of the intake port 15.

Further embodiments of the invention may include any combination of features from one or more dependent claims, and such features may be incorporated, collectively or separately, into any independent claim.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiment of the present disclosure may not include all of the features described yet still benefit from at least some of the advantages of such features. Those of ordinary skill in the are may readily devise their own implementations that incorporate one or more of the features of the present disclosure and fall within the spirit and scope of the present invention as defined by the appended claims.

The invention claimed is:

1. A power system, comprising:
    an internal combustion engine comprising an intake manifold and an exhaust manifold and a cylinder, the cylinder positioned fluidly between the intake manifold and the exhaust manifold, the intake manifold configured to intake an intake gas, the exhaust manifold configured to exhaust an exhaust gas, the exhaust gas comprising a recirculated portion and a remaining portion that exits the engine;
    an exhaust gas recirculation ("EGR") system positioned to receive the recirculated portion of the exhaust gas, the intake gas being a combination of a fresh intake gas and the recirculated portion of the exhaust gas, the EGR system comprising a high temperature EGR cooler positioned downstream of the exhaust manifold and a low temperature EGR cooler positioned downstream of the high temperature EGR cooler, the EGR coolers being configured to cool the recirculated portion of the exhaust gas such that, under at least some operating conditions, condensation forms;
    a turbine positioned downstream of the exhaust manifold and positioned to receive only the remaining portion of the exhaust gas; and
    a condensation injection system positioned downstream of the EGR cooler, the condensation injection system comprising:
    a condensation pump; and
    a condensation injector positioned downstream of the condensation pump, the condensation pump configured to pump the condensation to the condensation injector, and the condensation injector configured to inject the condensation into the intake gas.

2. The power system of claim 1, wherein the cylinder is one of a plurality of cylinders, the internal combustion engine comprises a plurality of intake ports, each intake port is positioned upstream of and opens into only a respective one of the cylinders, the intake port is configured to allow the intake gas into the cylinder, and the condensation injector is configured to inject the condensation into the intake gas in the intake port.

3. The power system of claim 1, wherein the internal combustion engine comprises an intake port positioned upstream of and opening into the cylinder, the intake port is configured to allow the intake gas into the cylinder, and the condensation injector is configured to inject the condensation into the intake gas downstream of the intake port and directly into the cylinder.

4. The power system of claim 1, comprising a compressor positioned upstream of the intake manifold, and the condensation injector configured to inject the condensation into the intake gas downstream of the compressor.

5. The power system of claim 1, wherein the condensation injection system comprises a reservoir, the reservoir is configured to collect the condensation, and condensation pump is configured to draw the condensation from the reservoir.

6. The power system of claim 5, comprising a separator disposed in the low temperature EGR cooler, the separator configured to separate the condensation from the recirculated portion of the exhaust gas, and the reservoir configured to receive condensation from the separator.

7. The power system of claim 5, comprising a heat source positioned adjacent to the reservoir, the heat source configured to heat the reservoir so as to prevent the condensation from freezing.

8. The power system of claim 7, comprising an engine control unit ("ECU"), the ECU configured to receive a signal indicative of a temperature of the reservoir, the ECU configured to adjust the operation of the heat source based on a freezing temperature of the condensation and based on the signal indicative of the temperature of the reservoir.

9. The power system of claim 1, comprising an engine control unit ("ECU"), the ECU configured to receive a signal indicative of a NOx level in the exhaust gas, and the ECU configured to adjust the operation of at least one of the condensation pump and the condensation injector based on the signal indicative of the NOx level.

10. The power system of claim 1, comprising an engine control unit ("ECU"), the ECU configured to receive a signal indicative of a condensation level in the reservoir, and the ECU configured to adjust the operation of at least one of the condensation pump and the condensation injector based on the signal indicative of the condensation level.

11. The power system of claim 1, comprising an engine control unit ("ECU") configured to receive a signal indicative of a power source speed, a signal indicative of a fuel setting, and a signal indicative of a fuel injection timing, the ECU is configured to determine a power level of the power system based on the signal indicative of the power source speed, the signal indicative of the fuel setting, and the signal indicative of the fuel injection timing, the ECU is configured to adjust the operation of at least one of the condensation pump and the condensation injector based on the determined power level of the power system.

12. A method for a power system, comprising:
cooling a recirculated portion of an exhaust gas in a high temperature exhaust gas recirculation ("EGR") cooler and a low temperature EGR cooler positioned downstream thereof such that condensation forms;
spinning a turbine with only a remaining portion of the exhaust gas; and
injecting the condensation via a condensation injector into an intake gas, the intake gas being a combination of the recirculated portion of the exhaust gas and a fresh intake gas.

13. The method of claim 12, wherein the injecting comprises introducing the condensation into the intake gas via a plurality of intake ports, and each intake port is upstream of and opens into only a respective one of the cylinders.

14. The method of claim 12, wherein the injecting comprises introducing the condensation into the intake gas downstream of an intake port and directly into the cylinder, and the intake port is upstream of and opens into the cylinder.

15. The method of claim 12, wherein the injecting comprises introducing the condensation into the intake gas downstream of a compressor.

16. The method of claim 12, comprising:
pumping the condensation to the condensation injector via a condensation pump;
receiving a signal indicative of a NOx level in the exhaust gas; and
adjusting the operation of at least one of the condensation pump and the condensation injector based on the signal indicative of the NOx level.

17. The method of claim 12, comprising:
pumping the condensation to the condensation injector via a condensation pump;
receiving a signal indicative of a condensation level in a reservoir; and
adjusting the operation of at least one of the condensation pump and the condensation injector based on the signal indicative of the condensation level.

18. The method of claim 12, comprising:
pumping the condensation to the condensation injector via a condensation pump;
receiving a signal indicative of a power source speed, a signal indicative of a fuel setting, and a signal indicative of a fuel injection timing;
determining a power level of the power system based on the signal indicative of the power source speed, the signal indicative of the fuel setting, and the signal indicative of the fuel injection timing; and
adjusting the operation of at least one of the condensation pump and the condensation injector based on the power level of the power system.

19. The method of claim 12, comprising:
receiving a signal indicative of a temperature of a reservoir; and
adjusting the operation of a heat source based on a freezing temperature of the condensation and based on the signal indicative of the temperature of the reservoir.

* * * * *